the position of the beet is changed, the face of
UNITED STATES PATENT OFFICE.

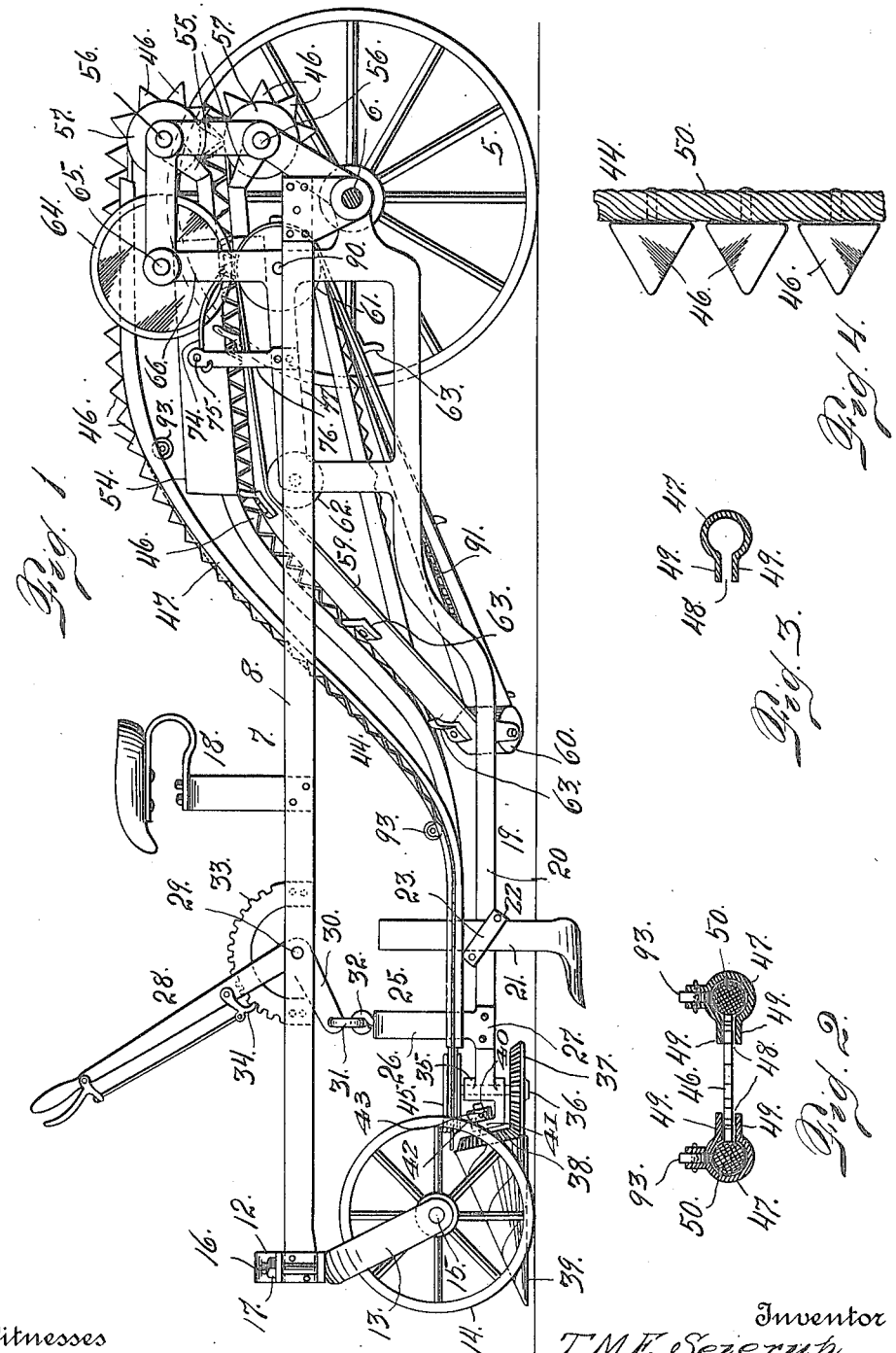

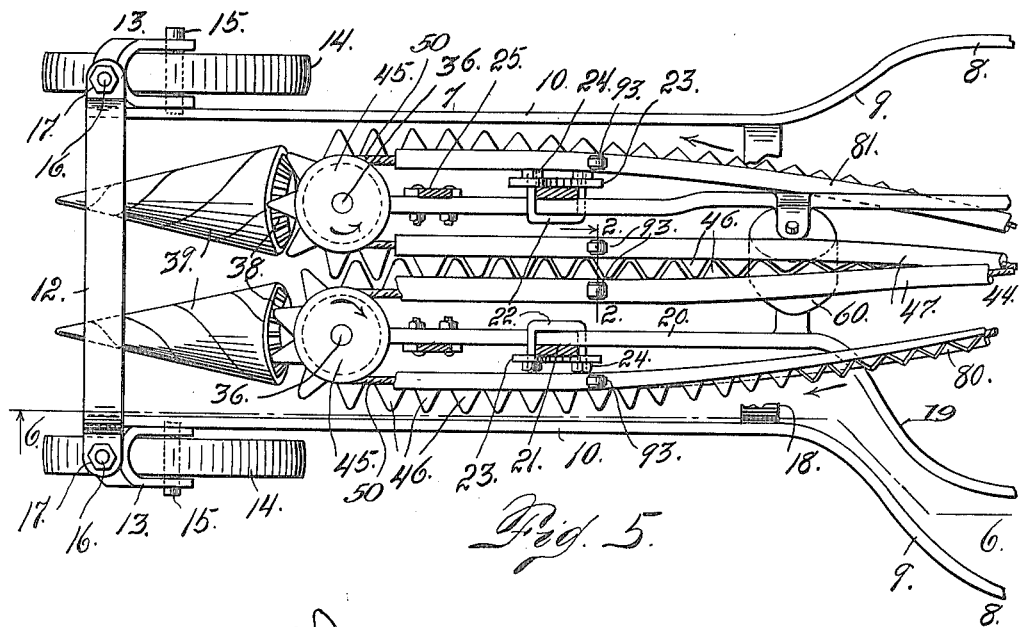

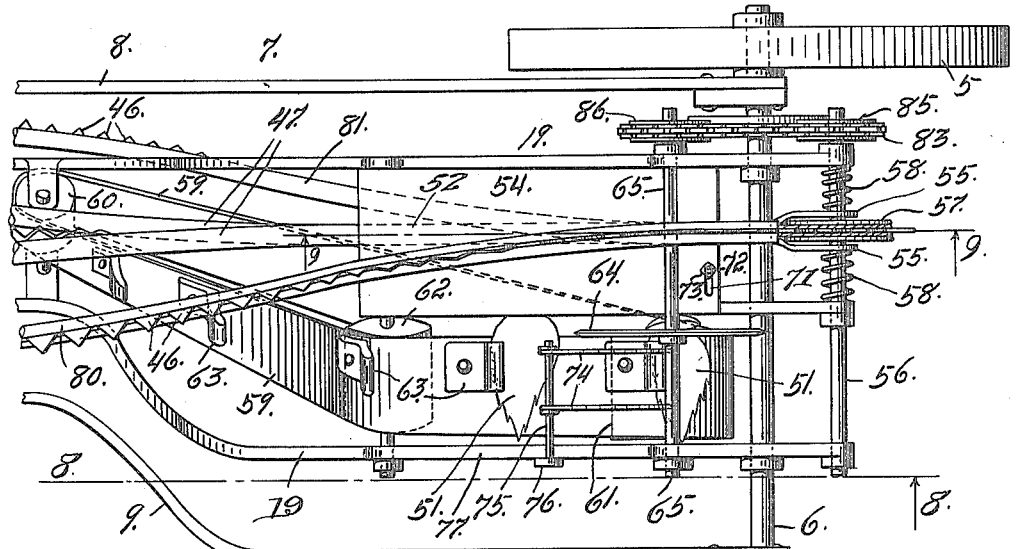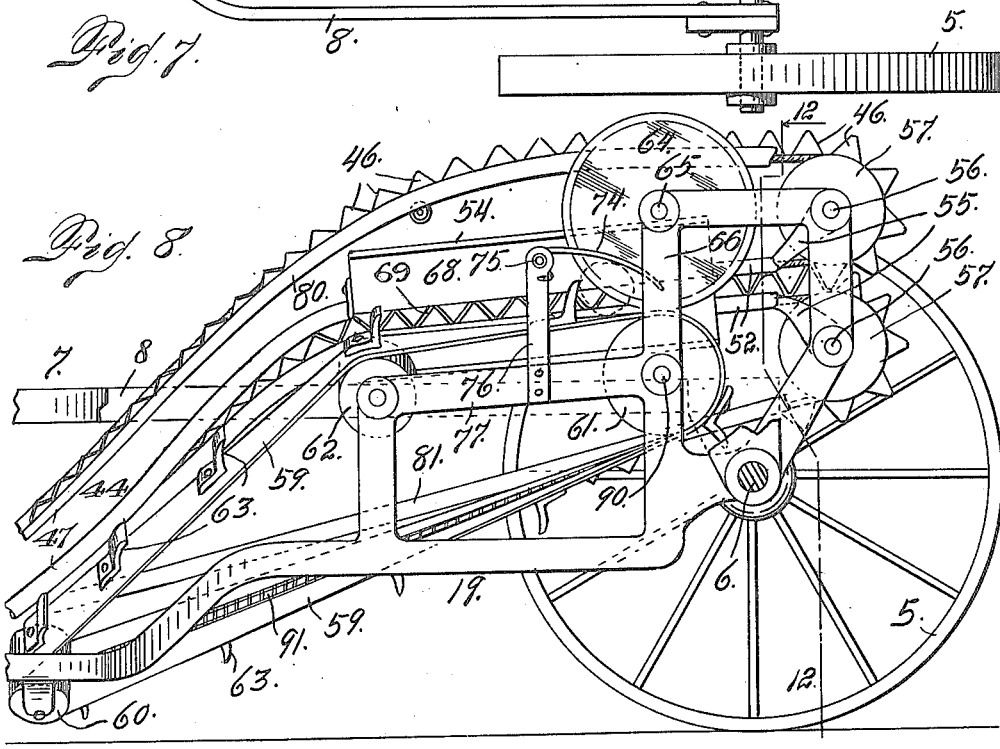

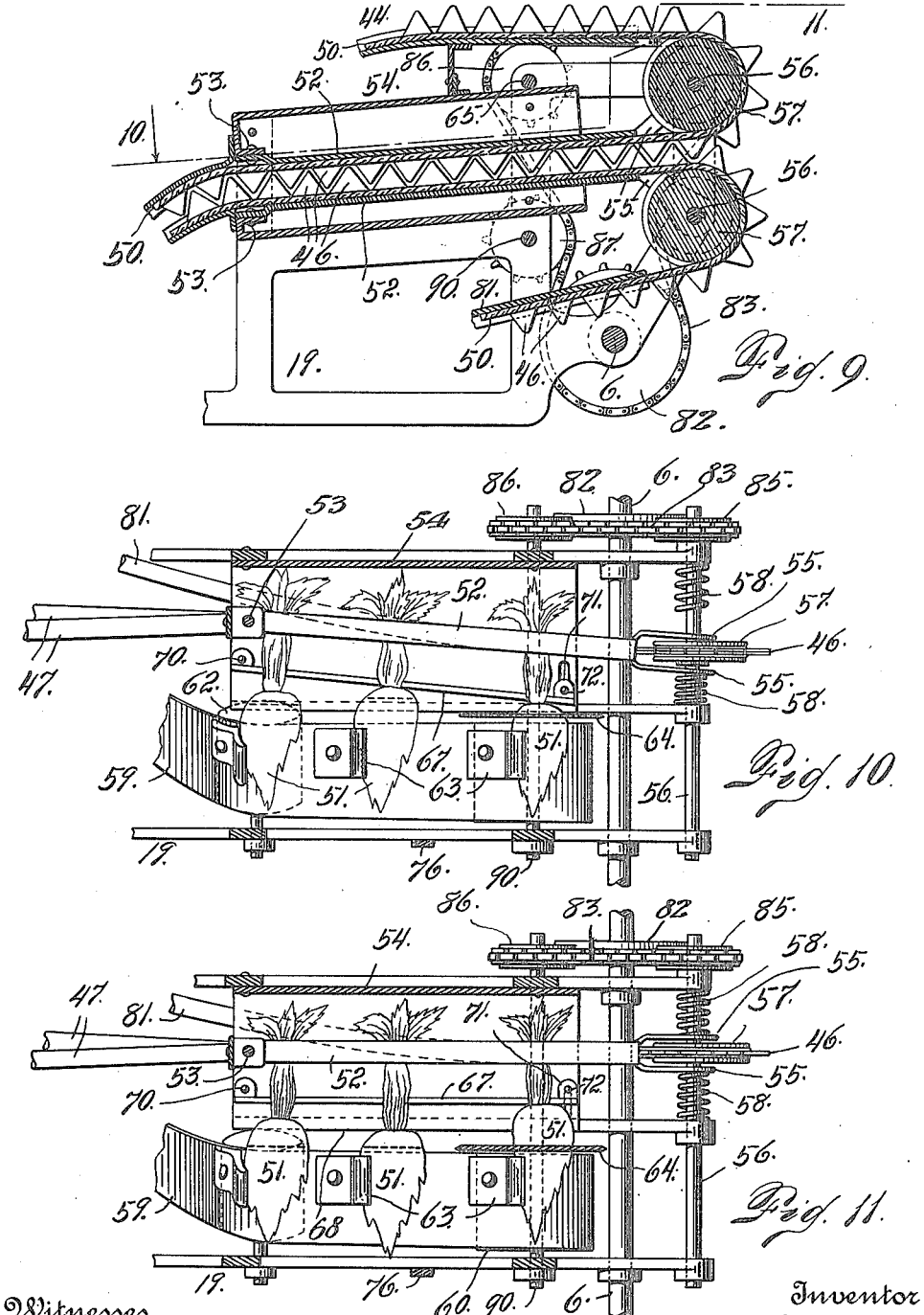

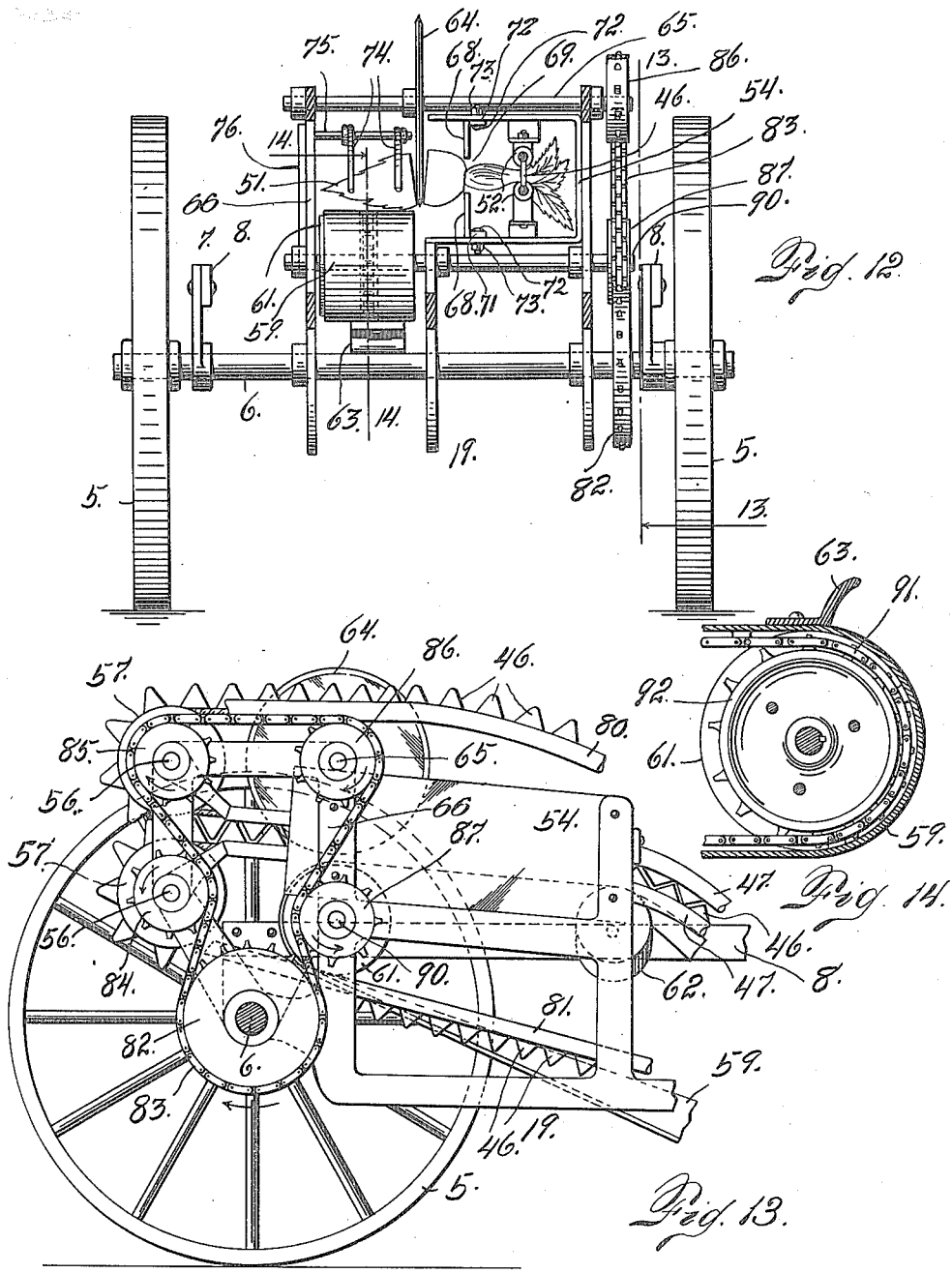

THEODOR M. E. SEIERUP, OF DENVER, COLORADO, ASSIGNOR OF ONE-HALF TO JAMES T. CRAIG, OF BELLEFOURCHE, SOUTH DAKOTA.

BEET-HARVESTER.

1,190,598.  Specification of Letters Patent.  Patented July 11, 1916.

Application filed February 24, 1914.  Serial No. 820,422.

*To all whom it may concern:*

Be it known that I, THEODOR M. E. SEIERUP, citizen of the United States, residing in the city and county of Denver and State of Colorado, have invented certain new and useful Improvements in Beet-Harvesters; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in harvesters, more especially intended for uprooting and topping sugar beets, but it must be understood that the apparatus is equally applicable for handling vegetables of all kinds whose bodies extend below the surface of the earth and have tops projecting above the same. In this specification, however, the apparatus will be described with special reference to its use in uprooting and topping beets, although, as heretofore indicated, it is not limited to such use.

My improved construction comprises a vehicle whose forward extremity is equipped with rotary devices adapted to extend underneath the tops of the beets and raise them into such a position that they may be grasped by the adjacent runs of endless conveyers, having intermeshing teeth or projections which act upon the tops of the beets, the said conveyers moving in guides which lift the beets above the ground. The guides of these conveyers are warped or torsionally formed to change the position of the beets from the vertical, which they occupy when first lifted from the ground, to the horizontal position, which they must occupy in order to properly perform the topping function, the last named function being performed by a knife rotating on a horizontal axis.

The conveyers which act upon the beets, as heretofore explained, consist of cables running in guides which are open to allow the teeth which engage the foliage of the beets to protrude for the purpose. By virtue of this construction the guides are closed, except that a very narrow space or opening is left through which the teeth extend. By virtue of this construction it becomes impossible for any material to enter the portions of the guides where the cables are located. This is an important advantage, since otherwise there would be a tendency to clog the endless devices carrying the teeth and thus prevent the proper operation of the machine.

An endless belt is employed having flights which coöperate with the endless conveyers, to carry the beets to the topping knife, after the conveyers have tilted the beets from the vertical to an inclined position. This belt is inclined at its forward extremity, but gradually approaches the horizontal, as the position of the beet is changed, the face of the belt being horizontal at the time the topping function is performed by the rotary knife.

The machine further consists of front and rear ground wheels connected by a suitable relatively stationary frame. There is another frame which is tiltable upon the rear axle of the machine. This last named frame carries the operating mechanism and is controlled by a manually operated lever readily accessible to the person in charge of the machine, who occupies a seat mounted on the stationary frame.

Having briefly outlined my improved construction I will proceed to describe the same in detail, reference being made to the accompanying drawing in which is illustrated an embodiment thereof.

In this drawing: Figure 1 is a side elevation of my improved machine. Fig. 2 is a vertical transverse section taken through the endless conveyers on the line 2—2, Fig. 5. Fig. 3 is a sectional view of one of the guides for one run of an endless conveyer. Fig. 4 is a fragmentary view of one of the endless conveyers. Fig. 5 is a top plan view of the forward part of the machine shown on a larger scale than in Fig. 1. Fig. 6 is a side elevation of the same. Fig. 7 is a top plan view of the rear part of the machine. Fig. 8 is a section taken on the line 8—8, Fig. 7, viewed in the direction of the arrow. Fig. 9 is a vertical longitudinal section taken through the rear part of the machine on the line 9—9, Fig. 7. Fig. 10 is a horizontal section taken on the line 10—11, Fig. 9, looking downwardly. Fig. 11 is a section taken on the same line showing the parts in a slightly different position. Fig. 12 is a section taken on the line 12—12, Fig. 8, looking toward the left. Fig. 13 is a section taken on the line 13—13, Fig. 12, viewed in the direction of the arrow. Fig. 14 is a section taken through one of the belt engaging pulleys, showing the belt in place and illustrating the sprocket chain and sprocket wheel construction of the belt and pulleys engaged thereby.

The same reference characters indicate the same parts in all the views.

Let the numeral 5 designate rear ground wheels which are fast on an axle 6 which supports the rear extremity of a relatively stationary frame 7, consisting of side bars 8 which are considerably wider in the rear and are bent inwardly intermediate their extremities, as shown at 9, and extend forwardly in parallel relation as shown at 10, their forward extremities being secured to a transversely arranged inverted U-shaped member 12, whose opposite extremities are connected with yokes 13 which straddle the forward ground wheels 14, the wheels engaging stub axles 15 which engage the yokes. The upper extremities of these yokes merge into stems, 16 which pass through the opposite extremities of the member 12, nuts 17 being applied to the stems above the said member for fastening purposes. Upon this stationary frame is mounted a seat 18 which the person in charge of the machine occupies, it being assumed that the vehicle is drawn across the field by draft animals who travel on opposite sides of the row of beets or other vegetables thereby harvested.

Pivotally mounted on the axle 6 at its rear extremity is a second frame 19, whose forward portion consists of horizontally disposed approximately parallel parts 20 which occupy positions quite close to the ground. The rear portion of this movable frame extends upwardly and is pivotally supported on the axle 6, as heretofore indicated. The forward portions 19 of the movable frame carry plows or dirt loosening devices 21, which are vertically adjustable on the parts 19 by means of U-shaped bolts 22, whose arms straddle the shanks of the plows and are connected with plates 23, through which the arms of the U-bolts pass, by means of nuts 24, which when tightened secure the plows firmly in place in the desired position of vertical adjustment.

Forward of the plows the parts 19 of the movable frame are connected by an arch-shaped member 25, having arms 26 whose lower extremities are secured to the parts 19 of the movable frame on opposite sides, as shown at 27. The central part of the member 25 is connected with a manually operable lever 28, which is bell-crank shaped and fulcrumed on the stationary frame, as shown at 29. The short arm 30 of this lever is connected with the member 25 by means of a ring 31 and an eye-bolt 32. The stationary frame is equipped with a notched quadrant 33, which coöperates with the pawl 34 of the lever in the usual manner. By virtue of this construction the movable frame may be raised or lowered, being moved on the axle 6 as a center.

The forward extremities of the parts 19 of the movable frame terminate in brackets 35, in which are journaled vertically disposed spindles 36, whose lower extremities are equipped with beveled gears 37 which are fast on the spindles and mesh with other similar gears or pinions 38, which are fast on cone-shaped members 39, having short rearwardly extending spindles 40 which are journaled in parts 41 of the brackets 35. The short spindles 40 are provided with stop collars 42 which are secured to the spindle by set bolts 43. The gears 38 are secured to the bases of the cones 39, the pointed extremities of the latter being forwardly directed. These two cones are suitably spaced to straddle the row of beets and their lower sides are parallel, approximately, with the surface of the ground over which the machine is traveling. The axes of the cones are approximately parallel, whereby their forward or pointed extremities are farther apart than any two points in the rear in the adjacent surfaces of the cones. By virtue of this construction the points of the cones act upon the portion of the tops or foliage of the beets farthest from the bodies of the latter, and as the machine travels forwardly the cones lift the foliage and gather or press the same together by virtue of the narrowing space between the adjacent surfaces of the cones, so that by the time the bases of the cones engage the foliage the latter is bunched and in position to be engaged by the endless conveyers 44 hereinafter more fully described.

The spindles 36 extend above the brackets 35, and to their upper portions are secured grooved pulleys 45 which are engaged by the endless conveyers 44, which consist of cables 50, having teeth 46 extending laterally from one side thereof, the teeth being approximately triangular in shape and those of the two conveyers being arranged to intermesh, whereby they grasp the tops of the beets as soon as they are bunched by the cones.

The plows are located slightly in the rear of the pulleys 45 and are arranged to loosen the dirt around the beets as soon as the conveyers have grasped the tops or foliage of the latter. The portions of the conveyers immediately forward and rear of these plows are arranged in parallel relation. In the rear of the plows, however, the conveyers extend upwardly by virtue of the arrangement of their guides 47 which are circular in cross-section to conform to the shape of the cables. These guides, however, are open on one side, as shown at 48, and separated flanges 49 extend therefrom on opposite sides of this opening, the said flanges being spaced to allow the teeth 46 of the cable to protrude. Slightly in the rear of the plows 21 the guides 47 are deflected upwardly and twisted so that their openings are so arranged that the teeth 46 instead of occupying horizontal positions gradually change to occupy vertical positions, whereby the beets 51, by virtue of the fact that their tops are engaged by the conveyers, are changed from the vertical to the horizontal position, as best illustrated in Figs. 7, 10 and 11. The rear portions 52 of each guide are pivotally connected, as shown at 53, with a casing 54, whereby these portions 52 are laterally adjustable, as shown in Fig. 10, to change the position of the beets as the latter are carried rearwardly. (See Fig. 10). The rear extremities 55 of the parts 52 of the guides extend respectively upwardly and downwardly and are perforated to receive shafts 56, carrying pulleys 57, which are slidable longitudinally of the shafts in order to change the position of the parts 52 of the guides from that shown in Figs. 7 and 11 to that shown in Fig. 10. The shafts 56 are equipped with spiral springs 58 which are arranged on opposite sides of the arms 55.

It should be stated that each guide member 52 is bifurcated at its rear extremity, whereby each terminates in two arms 55 which straddle the pulley 57, which is adjustable longitudinally of its shaft, as heretofore explained.

In order to support the bodies of the beets, as the conveyers are changing their position, in order to tilt the beets from the vertical to the horizontal position, a belt 59 is employed, the forward portion of the belt engaging a pulley 60, while its rear portion engages a pulley 61, a pulley 62 being intermediately located and arranged to engage the upper run of the belt. This belt is equipped with flights 63 and its lower forward portion is inclined so that the flights engage the bodies of the beets as soon as the latter are appreciably tilted from the vertical position, and as the conveyer runs which engage the tops of the beets extend upwardly and gradually merge into such a position that their intermeshing teeth are vertically disposed, the face of the upper run of the belt assumes a horizontal position, thus supporting the beets in a position to be acted on by the rotary knife 64, which is mounted on a horizontally disposed shaft 65, which is journaled in up-right parts 66, forming a part of the movable frame-work 19 of the machine.

Where it is desired to cut off the tops of the beets at a uniform distance from the top of the body of the beet, a horizontally inclined gage 67 is employed. This gage is composed of two members 68 separated by a slot 69, through which the beets pass, this device being so arranged that the parts 68 engage the top of the body of the beet adjacent the lower part of the foliage. Hence, as this gage is moved in the direction of the knife when the gage is horizontally inclined, the bodies of the beets are moved laterally to cause their tops to be severed at a uniform distance from the upper extremities of the bodies of the beets. This gage is pivoted at its forward extremity, as shown at 70, and its rear extremity is provided with horizontally disposed lugs 71, through which bolts 72 are passed, these bolts being secured by nuts 73 which may be loosened whenever it is desired to change the position of the gage. Care should be taken that the pivoted portions 52 of the cable guides be adjusted to occupy positions parallel, or approximately parallel, with the gage 67.

When it is desired to top the beets at the ground line, or the plane corresponding with the ground line, when the beet is in position in the earth, the portions 52 of the guides occupy a position in line with the direction of travel, while the gage 67 occupies the same position and practically performs no function. (See Fig. 11). In this case the distance from the portions of the tops of the beets which are engaged by the conveyers to the ground line of the bodies of the beets will be uniform. Hence, the knife 64 will sever the tops of the beets at the ground line, regardless of its distance from the top of the body of the beet. (See Fig. 11). In some sugar beet growing sections, as in Michigan, it is desirable to top the beets on a plane corresponding with the ground line, since the portion of the body of the beet which extends above the ground is undesirable; while in other sections, as in Colorado, it is desired to remove the foliage of the beets on a plane of uniform distance from the tops of the bodies thereof. Hence, in the latter case, the arrangement of the part shown in Fig. 10 would be employed, while in the former case the arrangement shown in Fig. 11 would be used.

Arranged above the bodies of the beets where they engage the knife 64, are spring tensioned fingers 74, which normally press downwardly on the bodies of the beets and hold them in proper position to be acted on by the knife during the performance of the topping function. These fingers are supported upon a spindle 75 mounted upon an upright arm 76, secured to a part 77 of the movable frame 19.

At the rear extremities of the active adjacent and intermeshing runs of the conveyers, the latter extend upwardly and downwardly, respectively, the upper extending part engaging a pulley 57, and the downwardly extending part a lower pulley 57. From these pulleys the upper and lower runs of the conveyers extend forwardly in engagement with the portions 80 and 81 of their guides, the said guides being so arranged that by the time the inactive runs of the conveyers approach the forward pulleys 45, the said conveyer runs are in such a position that their teeth occupy approximately horizontal planes, so that as the forward extremities of the inactive runs merge into the corresponding extremities of the active runs, the teeth intermesh in an approximately horizontal plane, as is required in order to advantageously act upon the foliage of the beets in order to perform the function heretofore explained.

The rotary movement of the various parts of the machine is imparted from the rear ground wheel 5 which serves to rotate the rear axle 6. Upon this axle (see Fig. 13) is mounted a sprocket wheel 82, which is engaged by a chain 83, the said chain engaging relatively small sprockets 84, 85, 86 and 87, fast on the spindles 56, 56, 65 and 90, to which the pulleys 57, 57, the knife 64 and the pulley 61 are made fast. By virtue of this arrangement the traveling movement of the endless conveyers is imparted, as well as the rotary action of the knife 64. It will also be understood that by virtue of the power taken from the rear ground wheels and the axle 6, the rotary movement is imparted to the forwardly located beveled gears 37, and thence to the rotary, foliage bunching cones 39.

In order that the belt 59 shall be positively operated without any slipping tendency, the inner central portion of the belt is equipped with a sprocket chain member 91, which engages inset sprocket wheel members 92, with which the pulleys 60, 61 and 62 are equipped. This construction for the various pulleys is illustrated in Fig. 14.

From the foregoing description, the use and operation of my improved harvester will be readily understood.

The machine is preferably drawn across the field by the use of draft animals in the usual way; that is to say, with one horse upon each side of the row of beets, the machine being so arranged that the cones 39 are on opposite sides of the beets of the row. As the machine travels across the field in this position, rotary motion is imparted to the cones and also to the endless traveling conveyers. The rotary action of the cones combined with the forward travel of the machine, causes the cones to first raise and then bunch the foliage of the beets, whereby this foliage is delivered in the bunched condition to the inner coöperating and intermeshing forward runs of the conveyers. During the travel of the machine the ground around the beets is loosened so that as the active runs of the conveyers extend upwardly and rearwardly, the beets are carried therewith, and by virtue of the warped or torsional condition of the guides, the active runs of the conveyers are so adjusted as to cause their teeth to gradually assume approximately the vertical position, whereby the position of the beets is gradually changed from the vertical to the horizontal, the bodies of the beets being supported during this tilting operation by the auxiliary instrumentality, namely, the belt 59. As soon as these beets have reached the horizontal position and are properly supported by the belt 59, they are carried to the topping knife 64, which acts thereon, either under the influence of the gage 67 and the adjustable coöperating guide members 52, or not, as may be desired, and accordingly as it is necessary or desirable to top the beets in a uniform plane with reference to the upper extremities of their body portions, or at the ground line as heretofore explained.

After the active runs of the conveyers have performed their function by delivering the beets to the knife and in position to be topped thereby, they extend respectively upwardly and downwardly, engaging the upper and lower rear pulleys 56 from which their inactive runs are guided forwardly and gradually assume the proper position as they approach the pulleys 45, to engage the bunched foliage of the beets as the inactive runs merge into the active runs of the conveyer. In order to reduce the friction between the cables 50 and the guides 47, particularly at points where bends of more or less abruptness are formed, the latter are equipped with anti-frictional rollers 93 having peripheral parts extending into the guides and adapted to be acted upon by the cables.

In order to adjust the vertical location of the bunching cones and other operating parts of the machine, the frame 19, together with the said parts, may be raised and lowered by the use of the lever 28 and in the manner heretofore described.

While the machine is traveling from place to place, or when not in use, the forwardly located operating devices may in the manner just explained be elevated sufficiently above the ground to pass over such ordinary articles as would otherwise prove obstacles to the travel of a machine of this character.

Having thus described my invention, what I claim is:

1. A vegetable harvester comprising a frame, soil loosening means, bunching means, a set of oppositely located horizontally disposed wheels, a second set of oppositely located vertically disposed wheels situated on a plane above the first named set of wheels, means for imparting motion to one set of wheels, a warped double guide leading from a point intermediate the peripheries of the horizontal set of wheels to a point approximately in alinement with the inner peripheries of the vertically disposed wheels, a plurality of toothed cables passing around and connecting the respective wheels of the two sets and engaging the said warped guide which is shaped to conform to the shape of the cables and is provided with relatively narrow slots to allow the teeth of the cables to extend beyond the guide.

2. A vegetable harvester comprising a frame, soil loosening means, bunching means, a set of oppositely located horizontally disposed wheels, a second set of oppositely located vertically disposed wheels situated on a plane above the first named set of wheels, means for imparting motion to one set of wheels, a warped double guide leading from a point intermediate the peripheries of the horizontal set of wheels to a point approximately in alinement with the inner peripheries of the vertically disposed wheels, a plurality of toothed cables passing around and connecting the respective wheels of the two sets and engaging the said warped guide which is shaped to conform to the shape of the cables and is provided with relatively narrow slots to allow the teeth of the cables to extend beyond the guide, a cutter and a twisted supporting belt traveling synchronously with the cables for supporting the vegetables and presenting them to the cutter in a horizontal position.

3. A vegetable harvester comprising soil loosening means, bunching means, a pair of toothed cables adapted to grasp the tops of the vegetables when bunched, a pair of horizontally disposed pulleys, around which the cables pass just prior to engaging the tops, a pair of pulleys located rearwardly of and on a higher plane than the first named pair, the cables passing in opposite directions around the last named pair of pulleys to release the tops, means for imparting a twist to the cables as they travel from the first named to the last named pair of pulleys, the cables having guides of countershape part provided with relatively narrow slots through which the teeth of the cables extend in order to act upon the tops of the vegetables.

4. A vegetable harvester comprising soil loosening means, bunching means, a pair of toothed cables adapted to grasp the vegetable tops after bunching, pulleys around which the cables pass, the cables being arranged on an incline and means for twisting the cables intermediate the pulleys, a cutter and a twisted supporting belt traveling synchronously with the cables for supporting the vegetables and presenting them to the cutter in a horizontal position, and guides for the cables, circular in cross section, and having relatively narrow slots spirally arranged to impart the twisting action to the cables through which slots the teeth of the cables extend.

5. A vegetable harvester comprising soil loosening means, bunching means, pulling means comprising a conveyer for grasping the tops of the vegetables to pull them out of the ground and a guide through which the conveyer passes, the guide being equipped with anti-frictional devices which the conveyer engages.

6. A vegetable harvester comprising soil loosening means, top bunching means, a conveyer for grasping the tops of the vegetables to pull them out of the ground, means for presenting the tops to the conveyer, a warped channel through which the conveyer passes, a cutter, means, including the conveyer, for changing the position of the beets from the vertical to the horizontal, and means located forward of the cutter for laterally adjusting the vegetables when in the horizontal position to regulate the cutting plane.

7. A vegetable harvester comprising soil loosening means, top bunching means, a conveyer for grasping the tops of the vegetables to pull them out of the ground, a warped channel through which the conveyer passes, a cutter, means, including the conveyer, for changing the position of the beets from the vertical to the horizontal, and means located forward of the cutter for laterally adjusting the vegetables when in the horizontal position to regulate the cutting plane, said means comprising a gage plate pivoted at one end.

8. A vegetable harvester comprising soil loosening means, a conveyer for grasping the tops of the vegetables to pull them out of the ground, means for presenting the tops to the conveyer, a warped channel through which the conveyer passes, a cutter, means, including the conveyer, for changing the position of the beets from the vertical to the horizontal, and means located forward of the cutter for laterally adjusting the vegetables when in the horizontal position to regulate the cutting plane, said means comprising a gage plate pivoted at one end and slotted intermediate its upper and lower edges to receive the vegetables.

9. A vegetable harvester comprising top bunching means, a conveyer for grasping the tops of the vegetables to pull them out of the ground, a cutter mounted on a horizontal axis and means for presenting the vegetables to the cutter in a horizontal position, including a warped guide through which the conveyer passes, the rear extremity of the last named guide being laterally adjustable adjacent the cutter to vary the plane of cut of the latter.

10. A vegetable harvester comprising top bunching means, a conveyer for grasping the tops of the vegetables to pull them out of the ground, a cutter mounted on a horizontal axis, means for presenting the vegetables to the cutter in a horizontal position, including a warped guide through which the conveyer passes, the rear extremity of the last named guide being laterally adjustable adjacent the cutter, and an inclined gage plate engaging the upper extremities of the bodies of the vegetables and located between the cutter and the laterally adjustable portion of the conveyer guide and coöperating with the latter, to vary the plane where the cutter engages the beets in removing the tops.

11. A vegetable harvester comprising top bunching means, a conveyer for grasping the tops of the vegetables to pull the latter out of the ground, a cutter mounted on a horizontal axis, means for presenting the vegetables to the cutter in a horizontal position, including a warped guide through which the conveyer passes, a gage plate arranged adjacent the knife and laterally adjustable, the said plate being in engagement with the bodies of the beets to vary the plane where the cutter engages the latter in removing the top, the rear portion of the conveyer being pivoted and laterally adjustable to conform to the position of the gage plate.

12. A vegetable harvester comprising top bunching means, conveyers for grasping the tops of the vegetables to pull the latter out of the ground, a cutter mounted on a horizontal axis, means for presenting the vegetables to the cutter in a horizontal position, including warped guides through which the conveyers pass, the rear portions of the conveyer guides being pivoted, the rear extremities of the pivoted portions of the guides being perforated, and spindles passing through said perforations and on which the pivoted portions are laterally adjustable.

13. A vegetable harvester comprising top bunching means, conveyers for grasping the tops of the vegetables to pull the latter out of the ground, a cutter mounted on a horizontal axis, means for presenting the vegetables to the cutter in a horizontal position, including warped guides through which the conveyers pass, the rear portions of the conveyer guides being pivoted and laterally adjustable adjacent the cutter, the rear extremities of the said portions of the guides being perforated, spindles passing through said perforations and springs mounted on the spindles on opposite sides of the guides.

14. A vegetable harvester comprising top bunching means, a conveyer for grasping the tops of the vegetables to pull the latter out of the ground, a cutter mounted on a horizontal axis, means for presenting the vegetables to the cutter in a horizontal position, including a warped guide through which the conveyer passes, the rear portion of the conveyer guides being pivoted and laterally adjustable adjacent the cutter, the rear extremities of the said portions of the guides being perforated, spindles passing through said perforations and springs mounted on the spindles on opposite sides of the guides, wheels mounted on the spindles and over which the conveying members pass after leaving the guides, the said wheels being adjustable longitudinally of the spindles and straddled by the rear extremities of the conveyer guides which are bifurcated for the purpose.

In testimony whereof I affix my signature in presence of two witnesses.

THEODOR M. E. SEIERUP.

Witnesses:
MAZE KIRBY,
A. J. O'BRIEN.